(12) United States Patent
Pitsianis et al.

(10) Patent No.: US 7,424,594 B2
(45) Date of Patent: Sep. 9, 2008

(54) EFFICIENT COMPLEX MULTIPLICATION AND FAST FOURIER TRANSFORM (FFT) IMPLEMENTATION ON THE MANARRAY ARCHITECTURE

(75) Inventors: Nikos P. Pitsianis, Durham, NC (US); Gerald George Pechanek, Cary, NC (US); Ricardo Rodriguez, Raleigh, NC (US)

(73) Assignee: Altera Corporation, San Jose, CA (US)

( * ) Notice: Subject to any disclaimer, the term of this patent is extended or adjusted under 35 U.S.C. 154(b) by 553 days.

(21) Appl. No.: 10/859,708

(22) Filed: Jun. 3, 2004

(65) Prior Publication Data

US 2004/0221137 A1 Nov. 4, 2004

Related U.S. Application Data

(62) Division of application No. 09/337,839, filed on Jun. 22, 1999, now Pat. No. 6,839,728.

(60) Provisional application No. 60/103,712, filed on Oct. 9, 1998.

(51) Int. Cl.
*G06F 15/76* (2006.01)
*G06F 9/302* (2006.01)

(52) U.S. Cl. .................. 712/24; 712/221; 712/212
(58) Field of Classification Search ............... 712/712, 712/212, 24, 221
See application file for complete search history.

(56) References Cited

U.S. PATENT DOCUMENTS

| | | | | |
|---|---|---|---|---|
| 4,587,626 A | * | 5/1986 | Gray | 708/405 |
| 5,442,579 A | * | 8/1995 | Thomson | 708/628 |
| 5,625,828 A | * | 4/1997 | Carmon et al. | 375/261 |
| 5,819,058 A | * | 10/1998 | Miller et al. | 712/210 |
| 5,835,392 A | * | 11/1998 | Dulong et al. | 708/404 |

* cited by examiner

*Primary Examiner*—Daniel Pan
(74) *Attorney, Agent, or Firm*—Priest & Goldstein, PLLC

(57) ABSTRACT

Efficient computation of complex multiplication results and very efficient fast Fourier transforms (FFTs) are provided. A parallel array VLIW digital signal processor is employed along with specialized complex multiplication instructions and communication operations between the processing elements which are overlapped with computation to provide very high performance operation. Successive iterations of a loop of tightly packed VLIWs are used allowing the complex multiplication pipeline hardware to be efficiently used. In addition, efficient techniques for supporting combined multiply accumulate operations are described.

20 Claims, 23 Drawing Sheets

MPYCX-MULTIPLY COMPLEX
ENCODING

| 31 30 29 | 28 27 | 26 25 24 23 22 | 21 20 19 18 17 | 16 15 14 13 12 11 | 10 9 8 7 6 | 5 4 3 | 2 1 | 0 |
|---|---|---|---|---|---|---|---|---|
| GROUP | S/P | UNIT | MAUopcode | Rt | Rx | Ry | CE3 | 0 | RM |

Syntax/Operation

210 →

| INSTRUCTION | OPERANDS | OPERATION | ACF |
|---|---|---|---|
| | | Dual Halfwords | |
| MPYCX.[SP]M.2SH | Rt, Rx, Ry RoundMode | Do operation below but do not affect ACFs | None |
| MPYCX.[CNVZ].[SP]M.2SH | Rt, Rx, Ry RoundMode | Rt.H1 ← round((Rx.H1 * Ry.H1 - Rx.H0 * Ry.H0)/2$^{15}$) <br> Rt.H0 ← round((Rx.H1 * Ry.H0 + Rx.H0 * Ry.H1)/2$^{15}$) | F1 <br> F0 |
| [TF].MPYCX.[SP]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER OPERATION PRIOR TO THE
    DIVIDE, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

FIG. 2B

CYCLES: 2

MPYCXD2-MULTIPLY COMPLEX DIVIDE BY 2
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | MAUopcode | | | | Rt | | | | | | Rx | | | | | | Ry | | | | | CE3 | | | 0 | RM |

FIG. 3A

Syntax/Operation

| INSTRUCTION | OPERANDS | OPERATION | ACF |
|---|---|---|---|
| | | Dual Halfwords | |
| MPYCXD2.[SP]M.2SH | Rt, Rx, Ry RoundMode | Do operation below but do not affect ACFs | None |
| MPYCXD2[CNVZ].[SP]M.2SH | Rt, Rx, Ry RoundMode | Rt.H1 ← round ((Rx.H1 * Ry.H1 - Rx.H0 * Rx.H0)/$2^{16}$) Rt.H0 ← round ((Rx.H1 * Ry.H0 + Rx.H0 * Ry.H1)/$2^{16}$) | F1 F0 |
| [TF].MPYCXD2.[SP]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION) | THE OPERAND RoundMode IS ONE OF THE FOLLOWING:
N=MSB OF RESULT
Z=1 IF ZERO RESULT IS GENERATED, 0 OTHERWISE
V=1 IF AN INTEGER OVERFLOW OCCURS ON EITHER OPERATION PRIOR TO THE DIVIDE, 0 OTHERWISE
C=NOT AFFECTED R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 3B

MPYCXJ-MULTIPLY COMPLEX CONJUGATE
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | S/P | UNIT | | | MAUopcode | | | | | Rt | | | | | | Rx | | | | | | Ry | | | | | CE3 | | 0 | RM | |

Syntax/Operation

| INSTRUCTION | OPERANDS | OPERATION | ACF |
|---|---|---|---|
| | | Dual Halfwords | |
| MPYCXJ.[SP]M.2SH | Rt, Rx, Ry<br>RoundMode | Do operation below but do not affect ACFs | None |
| MPYCXJ.[CNVZ].[SP]M.2SH | Rt, Rx, Ry<br>RoundMode | Rt.H1 ← round ((Rx.H1 * Ry.H1 + Rx.H0 * Ry.H0)/2$^{15}$)<br>Rt.H0 ← round ((Rx.H0 * Ry.H1 - Rx.H1 * Ry.H0)/2$^{15}$) | F1<br>F0 |
| [TF].MPYCXJ.[SP]M.2SH | Rt, Rx, Ry<br>RoundMode | Do operation only if T/F condition is satisfied in ACFs | None |

410

ARITHMETIC SCALAR FLAGS AFFECTED (ON LEAST SIGNIFICANT OPERATION) | THE OPERAND RoundMode IS ONE OF THE FOLLOWING:
N=MSB OF RESULT
Z=1 IF ZERO RESULT IS GENERATED, 0 OTHERWISE
V=1 IF AN INTEGER OVERFLOW OCCURS ON EITHER OPERATION, 0 OTHERWISE
C=NOT AFFECTED R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 4B

MPYCXJD2-MULTIPLY COMPLEX CONJUGATE DIVIDE BY 2
ENCODING

| 31 30 | 29 28 27 | 26 25 24 23 22 | 21 20 19 18 | 17 16 15 14 13 12 | 11 10 9 8 7 | 6 5 4 3 2 | 1 0 |
|---|---|---|---|---|---|---|---|
| GROUP | S/P UNIT | MAUopcode | Rt | Rx | Ry | CE3 0 | RM |

FIG. 5A

Syntax/Operation

| INSTRUCTION | OPERANDS | OPERATION | ACF |
|---|---|---|---|
| | | Dual Halfwords | |
| MPYCXJD2.[SP]M.2SH | Rt, Rx, Ry RoundMode | Do operation below but do not affect ACFs | None |
| MPYCXJD2[CNVZ].[SP]M.2SH | Rt, Rx, Ry RoundMode | RtH1 ← round ((Rx.H1 * Ry.H1 + Rx.H0 * Ry.H0)/2$^{16}$) | F1 |
| | | RtH0 ← round ((Rx.H0 * Ry.H1 - Rx.H1 * Ry.H0)/2$^{16}$) | F0 |
| [TF].MPYCXJD2.[SP]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER OPERATION, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

FIG. 5B

CYCLES: 2

INPUT OF THE DATA X AND ITS
CORRESPONDING TWIDDLE FACTOR W:

| LOAD | ALU | MAU | DSU | STORE |
|---|---|---|---|---|
| lii.p.w | | | | |
| lii.p.w | | | | |
| | | | | |
| | | | | |
| | | | | |
| | | | | |
| | | | | |
| | | | | |
| | | | | |
| | | | | |
| | | | | |

~910

THE COMPLEX ARGUMENTS X AND W ARE MULTIPLIED:

| LOAD | ALU | MAU | DSU | STORE |
|---|---|---|---|---|
| lii.p.w | | | | |
| lii.p.w | | mpycx.pm.2sh | | |
| | | | | |
| | | | | |
| | | | | |
| | | | | |
| | | | | |
| | | | | |
| | | | | |
| | | | | |
| | | | | |

~920

A COMMUNICATIONS OPERATIONS BETWEEN PEs:
| LOAD | ALU | MAU | DSU | STORE |
|---|---|---|---|---|
| lii.p.w | | | | |
| lii.p.w | | | | |
| | | mpycx.pm.2sh | | |
| | | | pexchg.pd.w | |
| | | | | |
| | | | | |
| | | | | |
| | | | | |
| | | | | |
| | | | | |
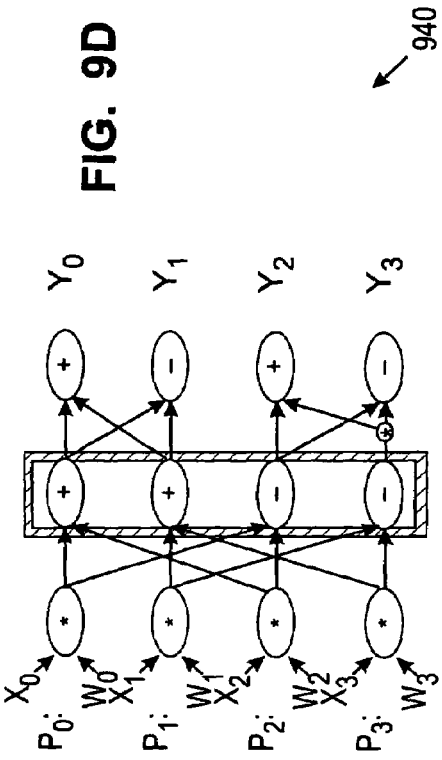
FIG. 9C ← 930
THE LOCAL AND RECEIVED QUANTITIES ARE ADDED OR SUBTRACTED (DEPENDING UPON THE PROCESSING ELEMENT.
| LOAD | ALU | MAU | DSU | STORE |
|---|---|---|---|---|
| lii.p.w | | | | |
| lii.p.w | | | | |
| | | mpycx.pm.2sh | | |
| | | | pexchg.pd.w | |
| | sub.pa.2h | | | |
| | | | | |
| | | | | |
| | | | | |
| | | | | |
| | | | | |
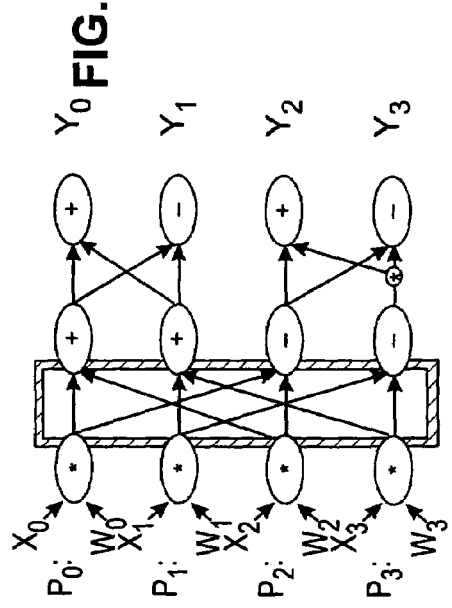
FIG. 9D ← 940

THE RESULT IS MULTIPLIED BY -i ON PE3:

| LOAD | ALU | MAU | DSU | STORE |
|---|---|---|---|---|
| lii.p.w | | | | |
| lii.p.w | | | | |
| | | mpycx.pm.2sh | | |
| | | | pexchg.pd.w | |
| | sub.pa.2h | | | |
| | | mpycx.pm.2h | | |
| | | | | |
| | | | | |
| | | | | |
| | | | | |
| | | | | |

ANOTHER SET OF PE-TO-PE COMMUNICATIONS WHERE THE PREVIOUS PRODUCT IS EXCHANGED BETWEEN THE PES:

| LOAD | ALU | MAU | DSU | STORE |
|---|---|---|---|---|
| lii.p.w | | | | |
| lii.p.w | | | | |
| | | mpycx.pm.2sh | | |
| | | | pexchg.pd.w | |
| | sub.pa.2h | | | |
| | | mpycx.pm.2h | | |
| | | | pexchg.pd.w | |
| | | | | |
| | | | | |
| | | | | |
| | | | | |

THE LOCAL AND RECEIVED QUANTITIES ARE ADDED OR SUBTRACTED (DEPENDING ON THE PROCESSING ELEMENT):

| LOAD | ALU | MAU | DSU | STORE |
|---|---|---|---|---|
| lii.p.w | | | | |
| lii.p.w | | | | |
| | | mpycx.pm.2sh | | |
| | sub.pa.2h | | | |
| | | | pexchg.pd.w | |
| | | mpycx.pm.2h | | |
| | sub.pa.2h | | | |
| | | | pexchg.pd.w | |
| | | | | |
| | | | | |

THE RESULTS ARE STORED TO LOCAL MEMORY:

| LOAD | ALU | MAU | DSU | STORE |
|---|---|---|---|---|
| lii.p.w | | | | |
| lii.p.w | | | | |
| | | mpycx.pm.2sh | | |
| | sub.pa.2h | | | |
| | | | pexchg.pd.w | |
| | | mpycx.pm.2h | | |
| | sub.pa.2h | | | |
| | | | pexchg.pd.w | |
| | | | | sii.p.w |

| VLIW | LOAD | ALU | MAU | DSU | STORE |
|---|---|---|---|---|---|
| | lii.p.w R0,a0=,1 | | | | |
| | lii.p.w R1,a1=,1 | | | | |
| | lii.p.w R0,a0=,1 | | mpycx.pm.2sh r2,r0,r1 | | |
| | lii.p.w R1,a1=,1 | | | | |
| | lii.p.w R0,a0=,1 | | mpycx.pm.2sh r2,r0,r1 | pexchg.pd.w r3,r2,2x2_north | |
| | lii.p.w R1,a1=,1 | sub.pa.2h r4,r2,r3 | | | |
| | lii.p.w R0,a0=,1 | sub.pa.2h r4,r2,r3 | mpycx.pm.2sh r2,r0,r1 | pexchg.pd.w r3,r2,2x2_north | |
| | lii.p.w R1,a1=,1 | | mpycx.pm.2h r5,r4,r8 | | |
| | lii.p.w R0,a0=,1 | sub.pa.2h r4,r2,r3 | mpycx.pm.2sh r2,r0,r1 | pexchg.pd.w r3,r2,2x2_north | |
| | lii.p.w R1,a1=,1 | sub.pa.2h r7,r5,r6 | mpycx.pm.2h r5,r4,r8 | pexchg.pd.w r6,r5,2x2_east | |
| 1 | lii.p.w R0,a0=,1 | sub.pa.2h r4,r2,r3 | mpycx.pm.2sh r2,r0,r1 | pexchg.pd.w r3,r2,2x2_north | |
| 2 | lii.p.w R1,a1=,1 | sub.pa.2h r7,r5,r6 | mpycx.pm.2h r5,r4,r8 | pexchg.pd.w r6,r5,2x2_east | sii.p.w r7,a2+,1 |
| 1 | lii.p.w R0,a0=,1 | sub.pa.2h r4,r2,r3 | mpycx.pm.2sh r2,r0,r1 | pexchg.pd.w r3,r2,2x2_north | |
| 2 | lii.p.w R1,a1=,1 | sub.pa.2h r7,r5,r6 | mpycx.pm.2h r5,r4,r8 | pexchg.pd.w r6,r5,2x2_east | sii.p.w r7,a2+,1 |

| | LOAD | ALU | MAU | DSU | STORE |
|---|---|---|---|---|---|
| 1 | | add.pa.4h r6,r4,r12 | | pexchg.pd.w r4,r2 | |
| 2 | lii.p.d r2,a0+,1 | | | pexchg.pd.w r5,r3 | sii.p.d r6,a1+,1 |
| 3 | | add.pa.4h r6,r4,r2 | | pexchg.pd.w r4,r12 | |
| 4 | lii.p.d r2,a0+,1 | | | pexchg.pd.w r5,r13 | sii.p.d r6,a1+,1 |

PE1

| | LOAD | ALU | MAU | DSU | STORE |
|---|---|---|---|---|---|
| 1 | lii.p.d r8,a2+,1 | sub.pa.4h r6,r4,r12 | mpycx.pm.2sh r12,r0,r18 | pexchg.pd.w r4,r2 | |
| 2 | lii.p.d r0,a0+,1 | | mpycx.pm.2sh r13,r1,r19 | pexchg.pd.w r5,r3 | sii.p.d r6,a1+,1 |
| 3 | lii.p.d r18,a2+,1 | sub.pa.4h r6,r4,r2 | mpycx.pm.2sh r2,r0,r8 | pexchg.pd.w r4,r12 | |
| 4 | lii.p.d r0,a0+,1 | | mpycx.pm.2sh r3,r1,r9 | pexchg.pd.w r5,r13 | sii.p.d r6,a1+,1 |

FIG. 9J $y = (I_m \otimes A) x$

Example: $y = (I_4 \otimes A) x_8$ $$\left( \begin{bmatrix} 1 & 0 & 0 & 0 \\ 0 & 1 & 0 & 0 \\ 0 & 0 & 1 & 0 \\ 0 & 0 & 0 & 1 \end{bmatrix} \otimes \begin{bmatrix} a & b \\ c & d \end{bmatrix} \right) \begin{bmatrix} x_0 \\ x_1 \\ x_2 \\ x_3 \\ x_4 \\ x_5 \\ x_6 \\ x_7 \end{bmatrix} = \begin{bmatrix} a & b & 0 & 0 & 0 & 0 & 0 & 0 \\ c & d & 0 & 0 & 0 & 0 & 0 & 0 \\ 0 & 0 & a & b & 0 & 0 & 0 & 0 \\ 0 & 0 & c & d & 0 & 0 & 0 & 0 \\ 0 & 0 & 0 & 0 & a & b & 0 & 0 \\ 0 & 0 & 0 & 0 & c & d & 0 & 0 \\ 0 & 0 & 0 & 0 & 0 & 0 & a & b \\ 0 & 0 & 0 & 0 & 0 & 0 & c & d \end{bmatrix} \begin{bmatrix} x_0 \\ x_1 \\ x_2 \\ x_3 \\ x_4 \\ x_5 \\ x_6 \\ x_7 \end{bmatrix} = \begin{bmatrix} ax_0 + bx_1 \\ cx_0 + dx_1 \\ ax_2 + bx_3 \\ cx_2 + dx_3 \\ ax_4 + bx_5 \\ cx_4 + dx_5 \\ ax_6 + bx_7 \\ cx_6 + dx_7 \end{bmatrix}$$

$y = (A \otimes I_m) x$

Example: $y = (A \otimes I_4) x_8$ $$\left( \begin{bmatrix} a & b \\ c & d \end{bmatrix} \otimes \begin{bmatrix} 1 & 0 & 0 & 0 \\ 0 & 1 & 0 & 0 \\ 0 & 0 & 1 & 0 \\ 0 & 0 & 0 & 1 \end{bmatrix} \right) \begin{bmatrix} x_0 \\ x_1 \\ x_2 \\ x_3 \\ x_4 \\ x_5 \\ x_6 \\ x_7 \end{bmatrix} = \begin{bmatrix} a & 0 & 0 & 0 & b & 0 & 0 & 0 \\ 0 & a & 0 & 0 & 0 & b & 0 & 0 \\ 0 & 0 & a & 0 & 0 & 0 & b & 0 \\ 0 & 0 & 0 & a & 0 & 0 & 0 & b \\ c & 0 & 0 & 0 & d & 0 & 0 & 0 \\ 0 & c & 0 & 0 & 0 & d & 0 & 0 \\ 0 & 0 & c & 0 & 0 & 0 & d & 0 \\ 0 & 0 & 0 & c & 0 & 0 & 0 & d \end{bmatrix} \begin{bmatrix} x_0 \\ x_1 \\ x_2 \\ x_3 \\ x_4 \\ x_5 \\ x_6 \\ x_7 \end{bmatrix} = \begin{bmatrix} ax_0 + bx_4 \\ ax_1 + bx_5 \\ ax_2 + bx_6 \\ ax_3 + bx_7 \\ cx_0 + dx_4 \\ cx_1 + dx_5 \\ cx_2 + dx_6 \\ cx_3 + dx_7 \end{bmatrix}$$

MPYA-MULTIPLY ACCUMULATE
ENCODING

1100

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | | UNIT | | | | MAUopcode | | | | RTE | | | | 0 | | Rx | | | | | | Ry | | | | 0 | CE2 | MPack | |

FIG. 11A

Syntax/Operation

1110

| INSTRUCTION | OPERANDS | OPERATION | ACF |
|---|---|---|---|
| | | | Word |
| MPYA.[SP]M.1[SU]W | Rte, Rx, Ry | Do operation below but do not affect ACFs | None |
| MPYA[CNVZ].[SP]M.1[SU]W | Rte, Rx, Ry | RtoIIRte ← (Rx * Ry) + RtoIIRte | F0 |
| [TF].MPYA.[SP]M.1[SU]W | Rte, Rx, Ry | Do operation only if T/F condition is satisfied in ACFs | None |
| | | | Dual Halfwords |
| MPYA.[SP]M.2[SU]H | Rte, Rx, Ry | Do operation below but do not affect ACFs | None |
| MPYA[CNVZ].[SP]M.1[SU]H | Rte, Rx, Ry | Rto ← (Rx.H1 * Ry.H1) + Rto | F1 |
| | | Rte ← (Rx.H0 * Ry.H0) + Rte | F0 |
| [TF].MPYA.[SP]M.2[SU]H | Rte, Rx, Ry | Do operation only if T/F condition is satisfied in ACFs | None |

ARITHMETIC FLAGS AFFECTED
N=MSB OF RESULT
Z=1 IF RESULT IS ZERO, 0 OTHERWISE
V=1 IF AN OVERFLOW OCCURS ON THE ADDITION, 0 OTHERWISE
C=1 IF AN CARRY OCCURS ON THE ADDITION, 0 OTHERWISE

CYCLES: 2

SUM2PA - SUM OF 2 PRODUCTS ACCUMULATE
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | MAUopcode | | | | | | Rt | | | | | Rx | | | | | Ry | | | | CE3 | | | | SumpExt | |
| | | | | | | | | | | | | Rte | | 0 | | | Rxe | | 0 | | | Rye | | 0 | | | | | | | |

1200

Syntax/Operation

1210

| INSTRUCTION | OPERANDS | OPERATION | ACF |
|---|---|---|---|
| | | Dual Halfwords | |
| SUM2PA.[S\|P]M.2[S\|U]H | Rt, Rx, Ry | Do operation below but do not affect ACFs | None |
| SUM2PA[CNVZ].[S\|P]M.2[S\|U]H | Rt, Rx, Ry | Rt ← Rt + (Rx.H1 * Ry.H1) + (Rx.H0 * Ry.H0) | F0 |
| [T\|F].SUM2PA.[S\|P]M.2[S\|U]H | Rt, Rx, Ry | Do operation only if T/F condition is satisfied in ACFs | None |
| | | Quad Halfwords | |
| SUM2PA.[S\|P]M.4[S\|U]H | Rte, Rxe, Rye | Do operation below but do not affect ACFs | None |
| SUM2PA[CNVZ].[S\|P]M.4[S\|U]H | Rte, Rxe, Rye | Rto ← Rto+ (Rxo.H1 * Ryo.H1) + (Rxo.H0 * Ryo.H0) | F1 |
| | | Rte ← Rte+ (Rxe.H1 * Rye.H1) + (Rxe.H0 * Rye.H0) | F0 |
| [T\|F].SUM2PA.[S\|P]M.4[S\|U]H | Rte, Rxe, Rye | Do operation only if T/F condition is satisfied in ACFs | None |

ARITHMETIC SCALAR FLAGS AFFECTED (on least significant operation)
N=MSB OF RESULT
Z=1 IF RESULT IS ZERO, 0 OTHERWISE
V=1 IF AN OVERFLOW OCCURS ON THE ADD WITH Rt, 0 OTHERWISE
C=1 IF AN CARRY OCCURS ON THE ADD WITH Rt,, 0 OTHERWISE

CYCLES: 2

FIG. 12B

MPYCXA-MULTIPLY COMPLEX ACCUMULATE
ENCODING

| 31 30 29 | 28 27 | 26 25 24 23 | 22 21 20 19 18 17 | 16 15 14 13 12 11 | 10 9 8 7 | 6 5 4 3 2 | 1 0 |
|---|---|---|---|---|---|---|---|
| GROUP | S/P | UNIT | MAUopcode | Rt | Rx | Ry | CE3 | 0 | RM |

Syntax/Operation

1310

| INSTRUCTION | OPERANDS | OPERATION | ACF |
|---|---|---|---|
|  |  | Dual Halfwords |  |
| MPYCXA.[SP]M.2SH | Rt, Rx, Ry RoundMode | Do operation below but do not affect ACFs | None |
| MPYCXA[CNVZ].[SP]M.2SH | Rt, Rx, Ry RoundMode | RtH1 ← round ((RtH1+ Rx.H1 * Ry.H1 - Rx.H0 * Ry.H0)/2$^{15}$) | F1 |
|  |  | RtH0 ← round ((RtH0+ Rx.H1 * Ry.H0 + Rx.H0 * Ry.H1)/2$^{15}$) | F0 |
| [TF].MPYCXA.[SP]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER OPERATION PRIOR TO THE DIVIDE, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

MPYCXAD2-MULTIPLY COMPLEX ACCUMULATE DIVIDE BY 2
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | MAUopcode | | | | Rt | | | | | | Rx | | | | | | Ry | | | | | CE3 | | | 0 | RM |

Syntax/Operation

| INSTRUCTION | OPERANDS | OPERATION | ACF |
|---|---|---|---|
| | | Dual Halfwords | |
| MPYCXAD2.[SP]M.2SH | Rt, Rx, Ry RoundMode | Do operation below but do not affect ACFs | None |
| MPYCXAD2[CNVZ].[SP]M.2SH | Rt, Rx, Ry RoundMode | RtH1 ← round ((RtH1+ Rx.H1 * Ry.H1 - Rx.H0 * Ry.H0)/2$^{16}$) RtH0 ← round ((RtH0+ Rx.H1 * Ry.H0 + Rx.H0 * Ry.H1)/2$^{16}$) | F1 F0 |
| [TF].MPYCXAD2.[SP]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION) | THE OPERAND RoundMode IS ONE OF THE FOLLOWING:
N=MSB OF RESULT
Z=1 IF ZERO RESULT IS GENERATED, 0 OTHERWISE
V=1 IF AN INTEGER OVERFLOW OCCURS ON EITHER OPERATION PRIOR TO THE
    DIVIDE, 0 OTHERWISE
C=NOT AFFECTED R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

MPYCXJ-MULTIPLY COMPLEX CONJUGATE ACCUMULATE
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| GROUP | | S/P | | UNIT | | | | MAUopcode | | | | Rt | | | | | Rx | | | | | | Ry | | | | | CE3 | | 0 | RM |

Syntax/Operation

| INSTRUCTION | OPERANDS | OPERATION | ACF |
|---|---|---|---|
| | | Dual Halfwords | |
| MPYCXJA.[S\|P]M.2SH | Rt, Rx, Ry RoundMode | Do operation below but do not affect ACFs | None |
| MPYCXJA{CNVZ}.[S\|P]M.2SH | Rt, Rx, Ry RoundMode | Rt.H1 ← round ((RtH1+ Rx.H1 * Ry.H1 + Rx.H0 * Ry.H0)/2$^{15}$) | F1 |
| | | Rt.H0 ← round ((RtH0+ Rx.H0 * Ry.H1 - Rx.H1 * Ry.H0)/2$^{15}$) | F0 |
| [TF].MPYCXJA.[S\|P]M.2SH | Rt, Rx, Ry RoundMode | Do operation only if T/F condition is satisfied in ACFs | None |

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 15B

MPYCXJD2-MULTIPLY COMPLEX CONJUGATE ACCUMULATE DIVIDE BY 2
ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | S/P | UNIT | | | MAUopcode | | | | | | | Rt | | | | | Rx | | | | | Ry | | | | | CE3 | | | 0 | RM |

Syntax/Operation

| INSTRUCTION | OPERANDS | OPERATION | ACF |
|---|---|---|---|
| | | | Dual Halfwords |
| MPYCXJAD2.[SP]M.2SH | Rt, Rx, Ry RoundMode | Do operation below but do not affect ACFs | None |
| MPYCXJAD2[CNVZ].[SP]M.2SH | Rt, Rx, Ry RoundMode | RtH1 ← round ((RtH1+ RxH1 * RyH1 + RxH0 * RyH0)/2$^{16}$) | F1 |
| | | RtH0 ← round ((RtH0+ RxH0 * RyH1 - RxH1 * RyH0)/2$^{16}$) | F0 |
| [TF].MPYCXJAD2.[SP]M.2SH | Rt, Rx, Ry RoundMode | Do operation only if T/F condition is satisfied in ACFs | None |

1610

ARITHMETIC SCALAR FLAGS AFFECTED (ON LEAST SIGNIFICANT OPERATION)
N=MSB OF RESULT
Z=1 IF ZERO RESULT IS GENERATED, 0 OTHERWISE
V=1 IF AN INTEGER OVERFLOW OCCURS ON EITHER OPERATION, 0 OTHERWISE
C=NOT AFFECTED

THE OPERAND RoundMode IS ONE OF THE FOLLOWING:
R=TRUNC FOR ROUNDING TOWARDS ZERO
R=CEIL FOR ROUNDING TOWARDS POSITIVE INFINITY
R=FLOOR FOR ROUNDING TOWARDS NEGATIVE INFINITY
R=ROUND FOR ROUNDING TO THE NEAREST INTEGER

CYCLES: 2

FIG. 16B

EFFICIENT COMPLEX MULTIPLICATION AND FAST FOURIER TRANSFORM (FFT) IMPLEMENTATION ON THE MANARRAY ARCHITECTURE

This application is a divisional of U.S. application Ser. No. 09/337,839 filed Jun. 22, 1999, now U.S. Pat. No. 6,839,728, which claims the benefit of U.S. Provisional Application Ser. No. 60/103,712 filed Oct. 9, 1998, which are incorporated by reference in their entirety herein.

FIELD OF THE INVENTION

The present invention relates generally to improvements to parallel processing, and more particularly to methods and apparatus for efficiently calculating the result of a complex multiplication. Further, the present invention relates to the use of this approach in a very efficient FFT implementation on the manifold array ("ManArray") processing architecture.

BACKGROUND OF THE INVENTION

The product of two complex numbers x and y is defined to be $z = x_R y_R - x_I y_I + i(x_R y_I + x_I y_R)$, where $x = x_R + i x_I$, $y = y_R + i y_I$ and i is an imaginary number, or the square root of negative one, with $i^2 = -1$. This complex multiplication of x and y is calculated in a variety of contexts, and it has been recognized that it will be highly advantageous to perform this calculation faster and more efficiently.

SUMMARY OF THE INVENTION

The present invention defines hardware instructions to calculate the product of two complex numbers encoded as a pair of two fixed-point numbers of 16 bits each in two cycles with single cycle pipeline throughput efficiency. The present invention also defines extending a series of multiply complex instructions with an accumulate operation. These special instructions are then used to calculate the FFT of a vector of numbers efficiently.

A more complete understanding of the present invention, as well as other features and advantages of the invention will be apparent from the following Detailed Description and the accompanying drawings.

BRIEF DESCRIPTION OF THE DRAWINGS

FIG. 2A illustrates a presently preferred multiply complex instruction, MPYCX;

FIG. 2B illustrates the syntax and operation of the MPYCX instruction of FIG. 2A;

FIG. 3A illustrates a presently preferred multiply complex divide by 2 instruction, MPYCXD2;

FIG. 3B illustrates the syntax and operation of the MPYCXD2 instruction of FIG. 3A;

FIG. 4A illustrates a presently preferred multiply complex conjugate instruction, MPYCXJ;

FIG. 4B illustrates the syntax and operation of the MPYCXJ instruction of FIG. 4A;

FIG. 5A illustrates a presently preferred multiply complex conjugate divide by two instruction, MPYCXJD2;

FIG. 5B illustrates the syntax and operation of the MPYCXJD2 instruction of FIG. 5A;

FIG. 9A-9H illustrate aspects of the implementation of a distributed FFT algorithm on a 2×2 ManArray processor using a VLIW algorithm with MPYCX instructions in a cycle-by-cycle sequence with each step corresponding to operations in the FFT signal flow graph;

FIG. 9I illustrates how multiple iterations may be tightly packed in accordance with the present invention for a distributed FFT of length four;

FIG. 9J illustrates how multiple iterations may be tightly packed in accordance with the present invention for a distributed FFT of length two;

FIGS. 10A and 10B illustrate Kronecker Product examples for use in reference to the mathematical presentation of the presently preferred distributed FFT algorithm;

FIG. 11A illustrates a presently preferred multiply accumulate instruction, MPYA;

FIG. 11B illustrates the syntax and operation of the MPYA instruction of FIG. 11A;

FIG. 12A illustrates a presently preferred sum of 2 products accumulate instruction, SUM2PA;

FIG. 12B illustrates the syntax and operation of the SUM2PA instruction of FIG. 12A;

FIG. 13A illustrates a presently preferred multiply complex accumulate instruction, MPYCXA;

FIG. 13B illustrates the syntax and operation of the MPYCXA instruction of FIG. 13A;

FIG. 14A illustrates a presently preferred multiply complex accumulate divide by two instruction, MPYCXAD2;

FIG. 14B illustrates the syntax and operation of the MPYCXAD2 instruction of FIG. 14A;

FIG. 15A illustrates a presently preferred multiply complex conjugate accumulate instruction, MPYCXJA;

FIG. 15B illustrates the syntax and operation of the MPYCXJA instruction of FIG. 15A;

FIG. 16A illustrates a presently preferred multiply complex conjugate accumulate divide by two instruction, MPYCXJAD2;

FIG. 16B illustrates the syntax and operation of the MPYCXJAD2 instruction of FIG. 16A;

DETAILED DESCRIPTION

Further details of a presently preferred ManArray architecture for use in conjunction with the present invention are found in U.S. Pat. No. 6,023,753, U.S. Pat. No. 6,167,502, U.S. Pat. No. 6,343,356, U.S. Patent No. 6,167,501 filed Oct. 9, 1998, U.S. Pat. No. 6,219,776, U.S. Pat. Ser. No. 6,151, 668, U.S. Pat. No. 6,173,389, U.S. Pat. No. 6,101,592, U.S. Pat. No. 6,216,223, U.S. Pat. No. 6,366,999, U.S. Pat. No. 6,446,190, as well as, U.S. Pat. No. 6,356,994, U.S. Pat. No. 6,839,728, U.S. Pat. No. 6,697,427, U.S. Pat. No. 6,256,683 and U.S. Pat. No. 6,260,082 and incorporated by reference herein in their entirety.

Figure 1:
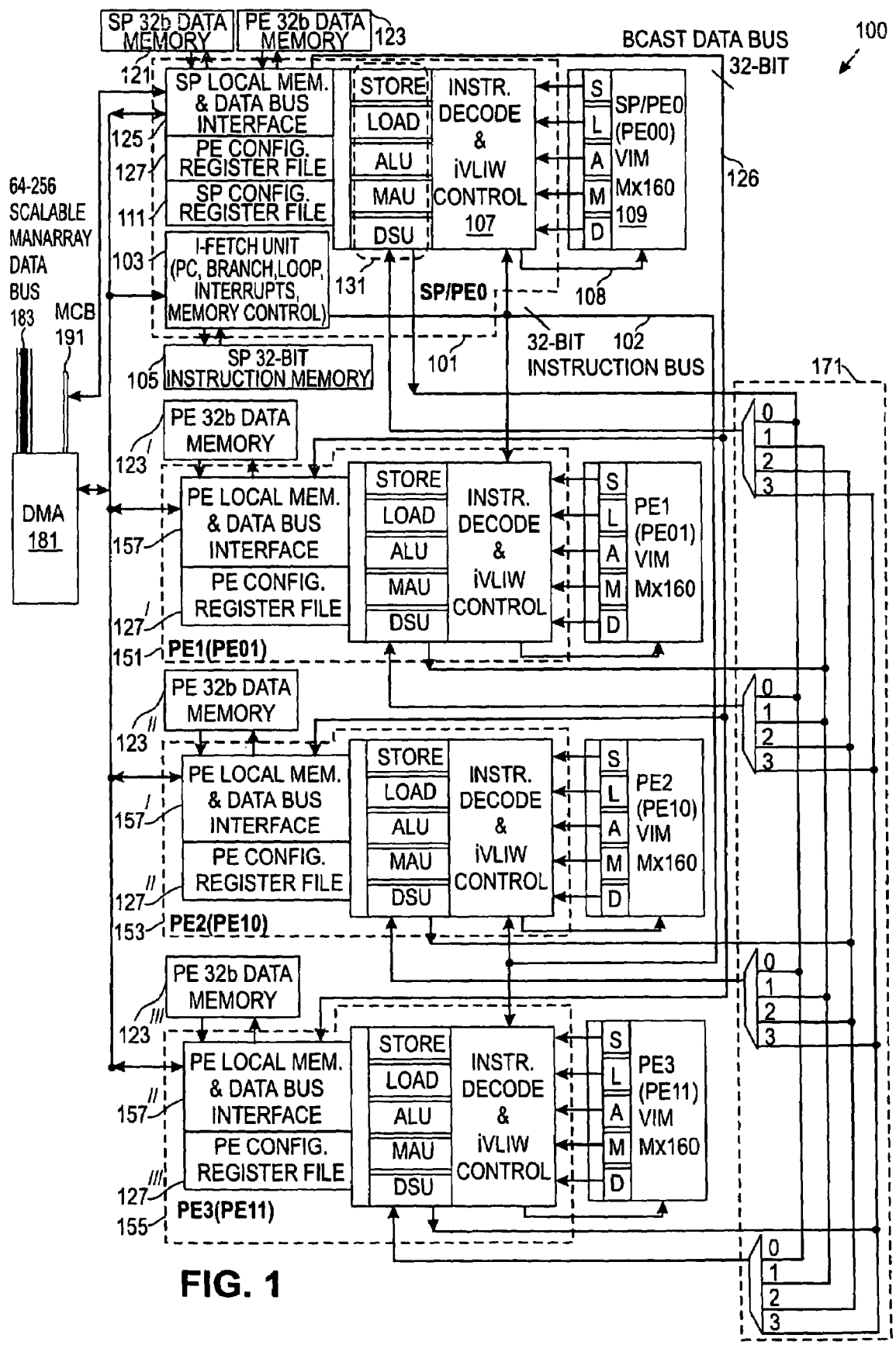
FIG. 1 illustrates an exemplary 2×2 ManArray iVLIW processor.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. Pat. No. 6,219,776. Three additional PEs 151, 153, and 155 are also utilized to demonstrate the implementation of efficient complex multiplication and fast fourier transform (FFT) computations on the ManArray architecture in accordance with the present invention. It is noted that the PEs can be also labeled with their matrix positions as shown in parentheses for PE0 (PE00) 101, PEI (PE01)151, PE2 (PE10) 153, and PE3 (PE11) 155.

The SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, digital signal processing, EP loop operations, support for interrupts, and also provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SPIPE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. Pat. No. 6.151,668. Also contained in the SP/PE0 and the other PEs is a common PE configurable register file 127 which is described in further detail in U.S. Pat. No. 6343.356.

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 more completely described in U.S. Pat. No. 6,023,753, U.S. Pat. No. 6,167,502, and U.S. Pat. No. 6,167,501. The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

All of the above noted patents are assigned to the assignee of the present invention and incorporated herein by reference in their entirety.

Special Instructions for Complex Multiply

Turning now to specific details of the ManArray processor as adapted by the present invention, the present invention defines the following special hardware instructions that execute in each multiply accumulate unit (MAU), one of the execution units 131 of FIG. 1 and in each PE, to handle the multiplication of complex numbers:

MPYCX instruction 200 (FIG. 2A), for multiplication of complex numbers, where the complex product of two source operands is rounded according to the rounding mode specified in the instruction and loaded into the target register. The complex numbers are organized in the source register such that halfword H1 contains the real component and halfword H0 contains the imaginary component. The MPYCX instruction format is shown in FIG. 2A. The syntax and operation description 210 is shown in FIG. 2B.

MPYCXD2 instruction 300 (FIG. 3A), for multiplication of complex numbers, with the results divided by 2, FIG. 3, where the complex product of two source operands is divided by two, rounded according to the rounding mode specified in the instruction, and loaded into the target register. The complex numbers are organized in the source register such that halfword H1 contains the real component and halfword H0 contains the imaginary component. The MPYCXD2 instruction format is shown in FIG. 3A. The syntax and operation description 310 is shown in FIG. 3B.

MPYCXJ instruction 400 (FIG. 4A), for multiplication of complex numbers where the second argument is conjugated, where the complex product of the first source operand times the conjugate of the second source operand, is rounded according to the rounding mode specified in the instruction and loaded into the target register. The complex numbers are organized in the source register such that halfword H1 contains the real component and halfword H0 contains the imaginary component. The MPYCXJ instruction format is shown in FIG. 4A. The syntax and operation description 410 is shown in FIG. 4B.

MPYCXJD2 instruction 500 (FIG. 5A), for multiplication of complex numbers where the second argument is conjugated, with the results divided by 2, where the complex product of the first source operand times the conjugate of the second operand, is divided by two, rounded according to the rounding mode specified in the instruction and loaded into the target register. The complex numbers are organized in the source register such that halfword H1 contains the real component and halfword H0 contains the imaginary component. The MPYCXJD2 instruction format is shown in FIG. 5A. The syntax and operation description 510 is shown in FIG. 5B.

All of the above instructions 200, 300, 400 and 500 complete in 2 cycles and are pipeline-able. That is, another operation can start executing on the execution unit after the first cycle. All complex multiplication instructions return a word containing the real and imaginary part of the complex product in half words H1 and H0 respectively.

To preserve maximum accuracy, and provide flexibility to programmers, four possible rounding modes are defined:

Round toward the nearest integer (referred to as ROUND)
Round toward 0 (truncate or fix, referred to as TRUNC)
Round toward infinity (round up or ceiling, the smallest integer greater than or equal to the argument, referred to as CEIL)
Round toward negative infinity (round down or floor, the largest integer smaller than or equal to the argument, referred to as FLOOR).

Figure 6:
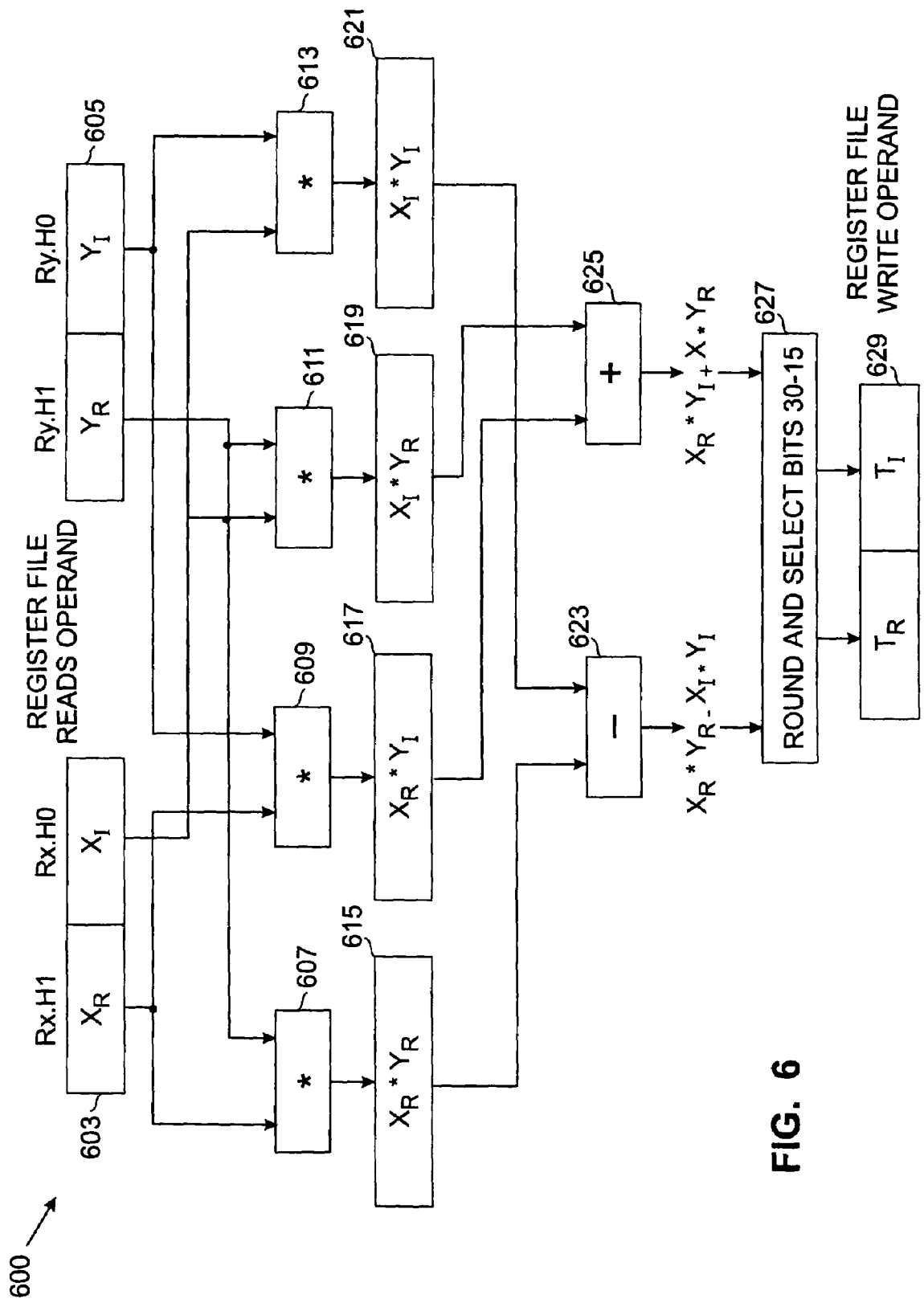
FIG. 6 illustrates hardware aspects of a pipelined multiply complex and its divide by two instruction variant.
Figure 7:
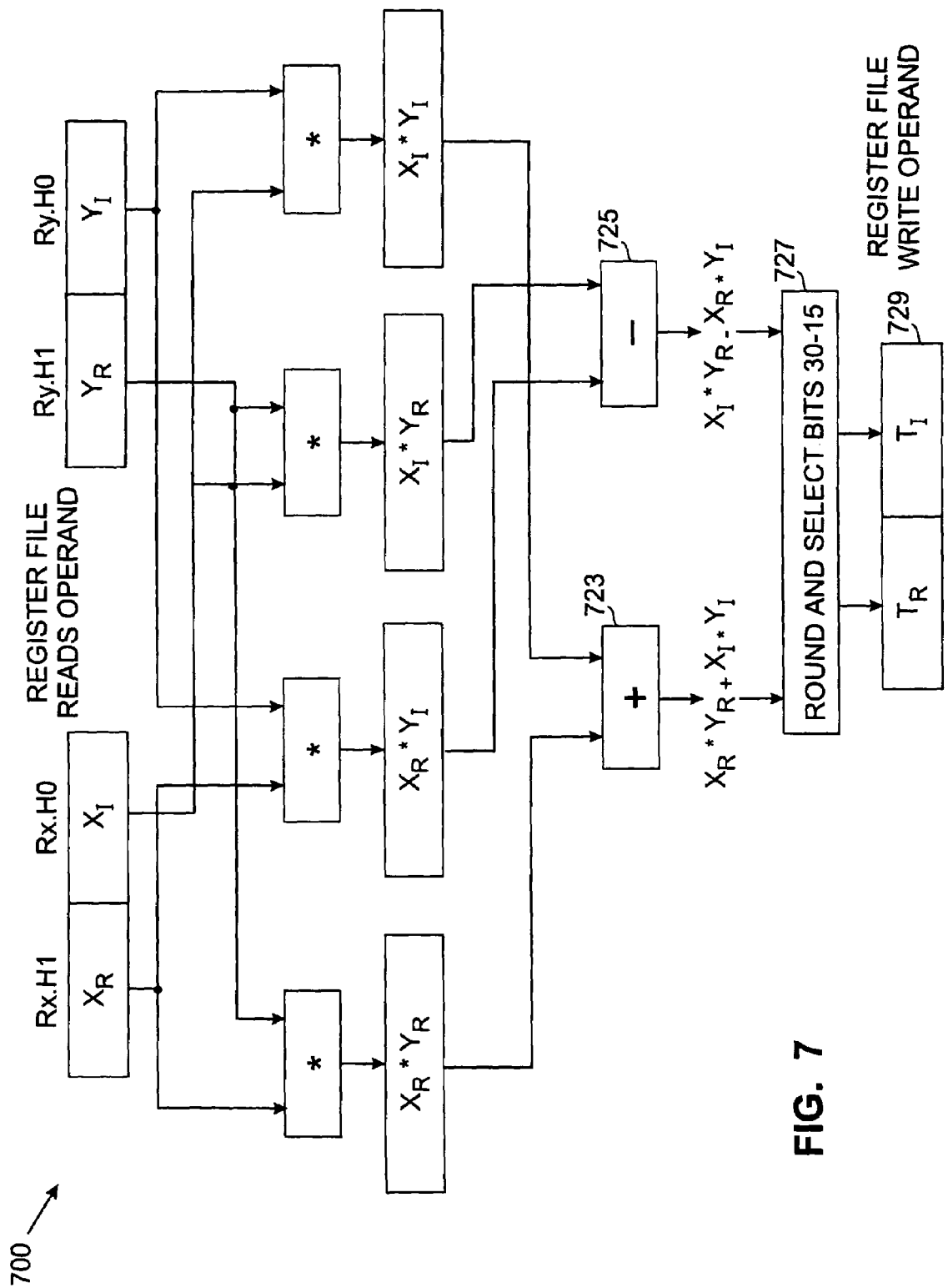
FIG. 7 illustrates hardware aspects of a pipelined multiply complex conjugate, and its divide by two instruction variant.

Hardware suitable for implementing the multiply complex instructions is shown in FIG. 6 and FIG. 7. These figures illustrate a high level view of the hardware apparatus 600 and 700 appropriate for implementing the functions of these instructions. This hardware capability may be advantageously embedded in the ManArray multiply accumulate unit (MAU), one of the execution units 131 of FIG. 1 and in each PE, along with other hardware capability supporting other MAU instructions. As a pipelined operation, the first execute cycle begins with a read of the source register operands from the compute register file (CRF) shown as registers 603 and 605 in FIG. 6 and as registers 111, 127, 127', 127", and 127''' in FIG. 1. These register values are input to the MAU logic after some operand access delay in halfword data paths as indicated to the appropriate multiplication units 607, 609, 611, and 613 of FIG. 6. The outputs of the multiplication operation units, $X_R*Y_R$ 607, $X_R*Y_I$ 609, $X_I*Y_R$ 611, and $X_I*Y_I$ 613, are stored in pipeline registers 615, 617, 619, and 621, respectively. The second execute cycle, which can occur while a new multiply complex instruction is using the first cycle execute facilities, begins with using the stored pipeline register values, in pipeline register 615, 617, 619, and 621, and appropriately adding in adder 625 and subtracting in subtractor 623 as shown in FIG. 6. The add function and subtract function are selectively controlled functions allowing either addition or subtraction operations as specified by the instruction. The values generated by the apparatus 600 shown in FIG. 6 contain a maximum precision of calculation which exceeds 16-bits. Consequently, the appropriate bits must be selected and rounded as indicated in the instruction before storing the final results. The selection of the bits and rounding occurs in selection and rounder circuit 627. The two 16-bit rounded results are then stored in the appropriate halfword position of the target register 629 which is located in the compute register file (CRF). The divide by two variant of the multiply complex instruction 300 selects a different set of bits as specified in the instruction through block 627. The hardware 627 shifts each data value right by an additional 1-bit and loads two divided-by-2 rounded and shifted values into each halfword position in the target registers 629 in the CRF.

The hardware 700 for the multiply complex conjugate instruction 400 is shown in FIG. 7. The main difference between multiply complex and multiply complex conjugate is in adder 723 and subtractor 725 which swap the addition and subtraction operation as compared with FIG. 6. The results from adder 723 and subtractor 725 still need to be selected and rounded in selection and rounder circuit 727 and the final rounded results stored in the target register 729 in the CRF. The divide by two variant of the multiply complex conjugate instruction 500 selects a different set of bits as specified in the instruction through selection and rounder circuit 727. The hardware of circuit 727 shifts each data value right by an additional 1-bit and loads two divided-by-2 rounded and shifted values into each halfword position in the target registers 729 in the CRF.

The FFT Algorithm

The power of indirect VLIW parallelism using the complex multiplication instructions is demonstrated with the following fast Fourier transform (FFT) example. The algorithm of this example is based upon the sparse factorization of a discrete Fourier transform (DFT) matrix. Kronecker-product mathematics is used to demonstrate how a scalable algorithm is created.

The Kronecker product provides a means to express parallelism using mathematical notation. It is known that there is a direct mapping between different tensor product forms and some important architectural features of processors. For example, tensor matrices can be created in parallel form and in vector form. J. Granata, M. Conner, R. Tolimieri, The Tensor Product: A Mathematical Programming Language for FFTs and other Fast DSP Operations, *IEEE SP Magazine*, January 1992, pp. 40-48. The Kronecker product of two matrices is a block matrix with blocks that are copies of the second argument multiplied by the corresponding element of the first argument. Details of an exemplary calculation of matrix vector products $$y=(I_m \otimes A)x$$

are shown in FIG. 10A. The matrix is block diagonal with m copies of A. If vector x was distributed block-wise in m processors, the operation can be done in parallel without any communication between the processors. On the other hand, the following calculation, shown in detail in FIG. 10B, $$y=(A \otimes I_m)x$$

requires that x be distributed physically on m processors for vector parallel computation.

The two Kronecker products are related via the identity $$I_m \otimes A = P(A \otimes I)P^T$$

where P is a special permutation matrix called stride permutation and $P^T$ is the transpose permutation matrix. The stride permutation defines the required data distribution for a parallel operation, or the communication pattern needed to transform block distribution to cyclic and vice-versa.

The mathematical description of parallelism and data distributions makes it possible to conceptualize parallel programs, and to manipulate them using linear algebra identities and thus better map them onto target parallel architectures. In addition, Kronecker product notation arises in many different areas of science and engineering. The Kronecker product simplifies the expression of many fast algorithms. For example, different FFT algorithms correspond to different sparse matrix factorizations of the Discrete Fourier Transform (DFT), whose factors involve Kronecker products. Charles F. Van Loan, *Computational Frameworks for the Fast Fourier Transform*, SIAM, 1992, pp 78-80.

The following equation shows a Kronecker product expression of the FFT algorithm, based on the Kronecker product factorization of the DFT matrix, $$F_n=(F_p \otimes I_m)D_{p,m}(I_p \otimes F_m)P_{n,p}$$

where:
n is the length of the transform
p is the number of PEs
m=n/p

The equation is operated on from right to left with the $P_{n,p}$ permutation operation occurring first. The permutation directly maps to a direct memory access (DMA) operation that specifies how the data is to be loaded in the PEs based upon the number of PEs p and length of the transform n.

$$F_n=(F_p \otimes I_M)D_{p,m}(I_p \otimes F_m)P_{n,p}$$

where $P_{n,p}$ corresponds to DMA loading data with stride p to local PE memories.

In the next stage of operation all the PEs execute a local FFT of length m=n/p with local data. No communications between PEs is required.

$$F_n=(F_p \otimes I_m)D_{p,}(I_p \otimes F_m)P_{n,}$$

where $(I_p \otimes F_m)$ specifies that all PEs execute a local FFT of length m sequentially, with local data.

In the next stage, all the PEs scale their local data by the twiddle factors and collectively execute m distributed FFTs of length p. This stage requires inter-PE communications.

$$F_n = (F_n \otimes I_m) D_{p,m} (I_p \otimes F_m) P_{n,p}$$

where $(F_p \otimes I_m) D_{p,m}$ specifies that all PEs scale their local data by the twiddle factors and collectively execute multiple FFTs of length p on distributed data. In this final stage of the FFT computation, a relatively large number m of small distributed FFTs of size p must be calculated efficiently. The challenge is to completely overlap the necessary communications with the relatively simple computational requirements of the FFT.

Figure 8:
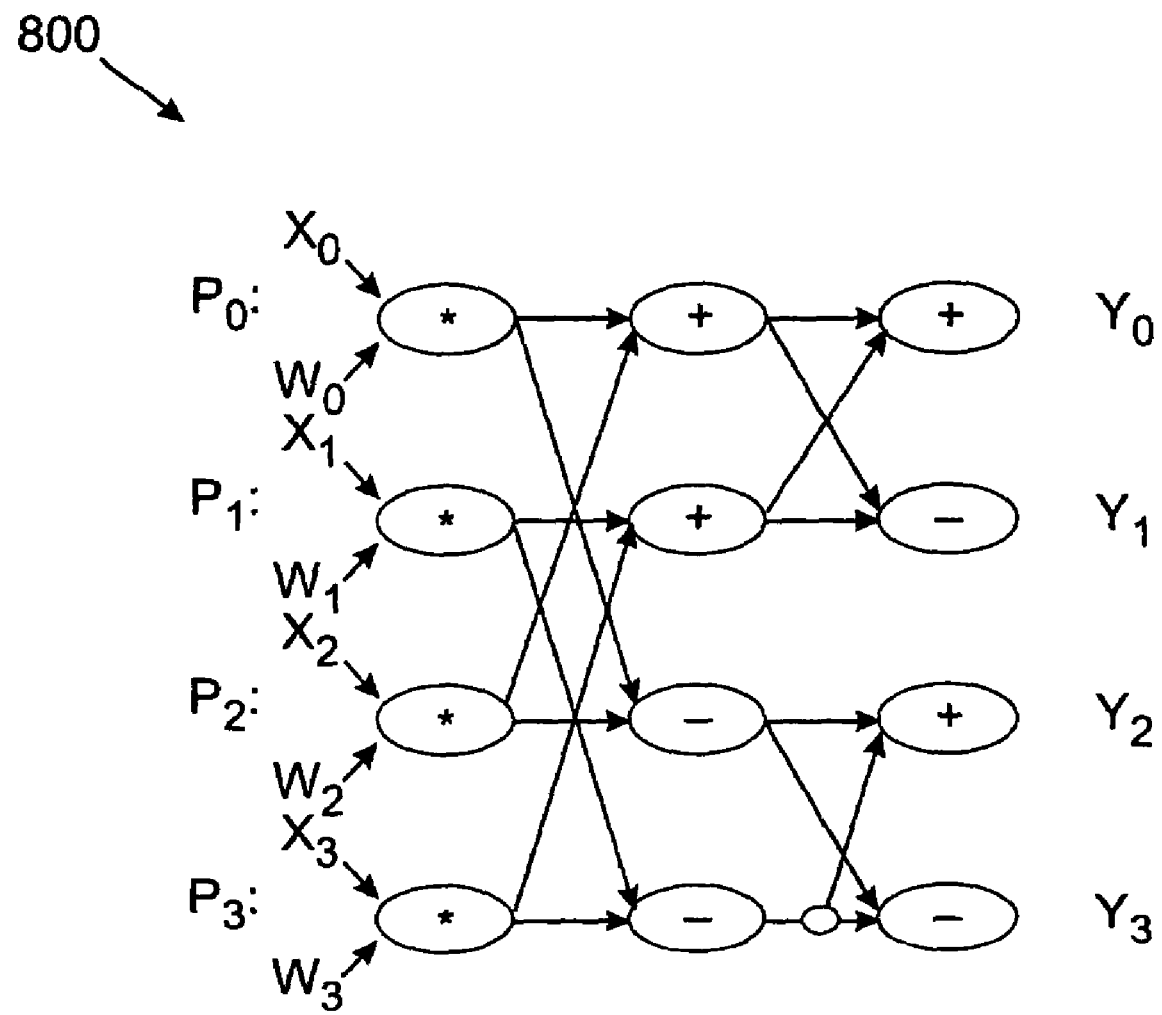
FIG. 8 shows an FFT signal flow graph.

The sequence of illustrations of FIGS. 9A-9H outlines the ManArray distributed FFT algorithm using the indirect VLIW architecture, the multiply complex instructions, and operating on the 2×2 ManArray processor 100 of FIG. 1. The signal flow graph for the small FFT is shown in FIG. 8 and also shown in the right-hand-side of FIGS. 9A-9H. In FIG. 8, the operation for a 4 point FFT is shown where each PE executes the operations shown on a horizontal row. The operations occur in parallel on each vertical time slice of operations as shown in the signal flow graph figures in FIGS. 9A-9H. The VLIW code is displayed in a tabular form in FIGS. 9A-9H that corresponds to the structure of the ManArray architecture and the iVLIW instruction. The columns of the table correspond to the execution units available in the ManArray PE: Load Unit, Arithmetic Logic Unit (ALU), Multiply Accumulate Unit (MAU), Data Select Unit (DSU) and the Store Unit. The rows of the table can be interpreted as time steps representing the execution of different iVLIW lines.

Figure 9A:
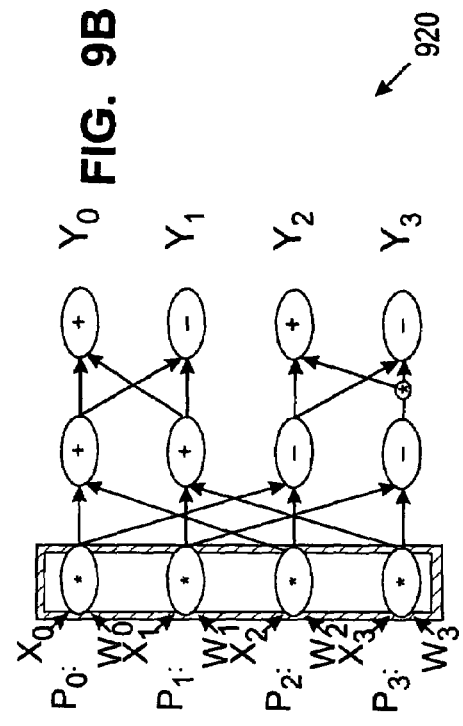
Figure 9B:
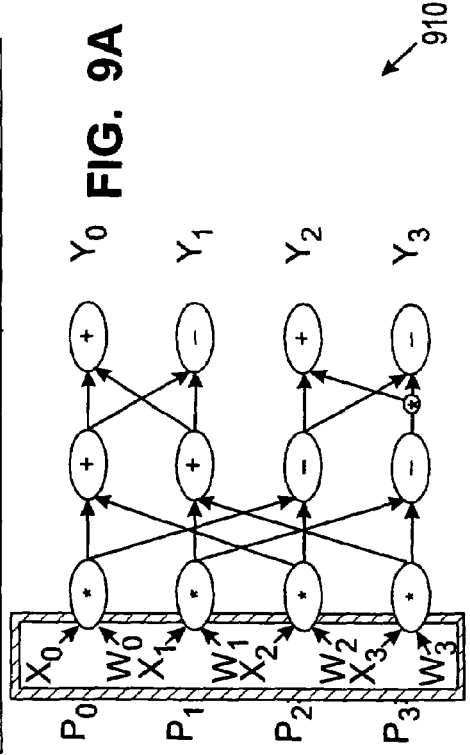
Figure 9E:
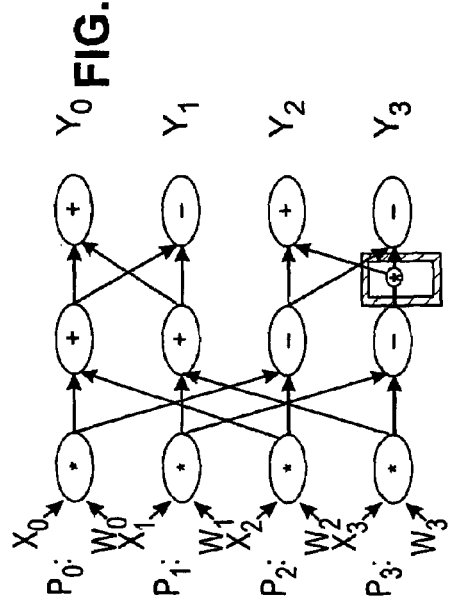
Figure 9F:
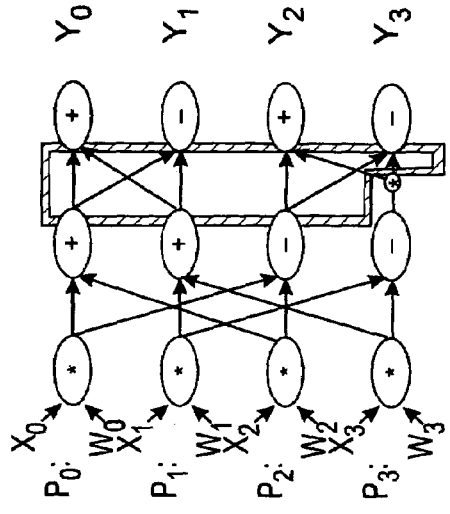
Figure 9G:
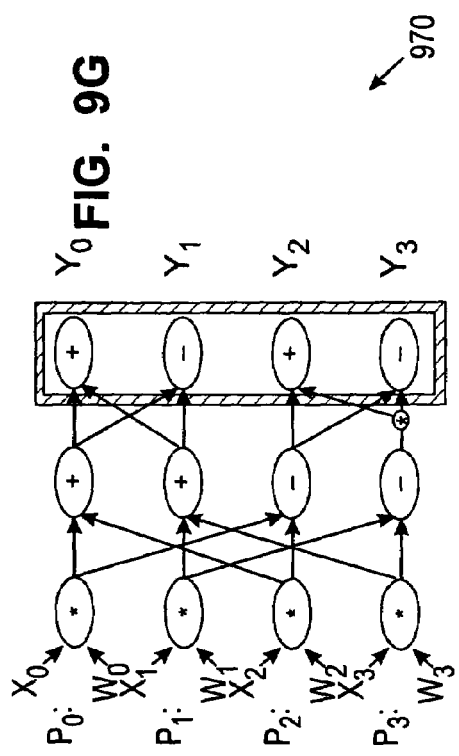
Figure 9H:
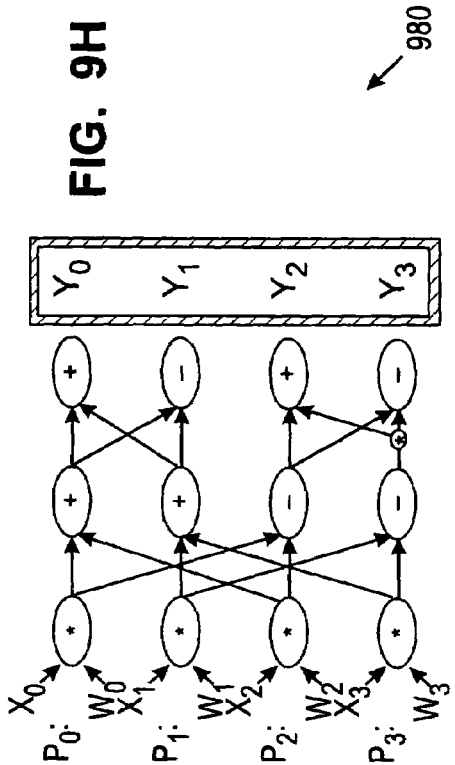

The technique shown is a software pipeline implemented approach with iVLIWs. in FIGS. 9A-9I, the tables show the basic pipeline for PE3 155. FIG. 9A represents the input of the data X and its corresponding twiddle factor W by loading them from the PEs local memories, using the load indirect (Lii) instruction. FIG. 9B illustrates the complex arguments X and W which are multiplied using the MPYCX instruction 200, and FIG. 9C illustrates the communications operation between PEs, using a processing element exchange (PEXCHG) instruction. Further details of this instruction are found in U.S. Pat. No. 6,167,501. FIG. 9D illustrates the local and received quantities are added or subtracted (depending upon the processing element, where for PE3 a subtract (sub) instruction is used). FIG. 9E illustrates the result being multiplied by -i on PE3, using the MPYCX instruction. FIG. 9F illustrates another PE-to-PE communications operation where the previous product is exchanged between the PEs, using the PEXCHG instruction. FIG. 9G illustrates the local and received quantities are added or subtracted (depending upon the processing element; where for PE3 a subtract (sub) instruction is used). FIG. 9H illustrates the step where the results are stored to local memory, using a store indirect (sii) instruction.

The code for PEs 0, 1, and 2 is very similar, the two subtractions in the arithmetic logic unit in steps 9D and 9G are substituted by additions or subtractions in the other PEs as required by the algorithm displayed in the signal flow graphs. To achieve that capability and the distinct MPYCX operation in FIG. 9E shown in these figures, synchronous MIMD capability is required as described in greater detail in U.S. Pat. No. 6,151,668 and incorporated by reference herein in its entirety. By appropriate packing, a very tight software pipeline can be achieved as shown in FIG. 9I for this FFT example using only two VLIWs.

In the steady state, as can be seen in FIG. 9I, the Load, ALU, MAU, and DSU units are fully utilized in the two VLIWs while the store unit is used half of the time. This high utilization rate using two VLIWs leads to very high performance. For example, a 256-point complex FFT can be accomplished in 425 cycles on a 2×2 ManArray.

As can be seen in the above example, this implementation accomplishes the following:

An FFT butterfly of length 4 can be calculated and stored every two cycles, using four PEs.

The communication requirement of the FFT is completely overlapped by the computational requirements of this algorithm.

The communication is along the hypercube connections that are available as a subset of the connections available in the ManArray interconnection network.

The steady state of this algorithm consists of only two VLIW lines (the source code is two VLIW lines long).

All execution units except the Store unit are utilized all the time, which lead us to conclude that this implementation is optimal for this architecture.

Problem Size Discussion

The equation:

$$F_n = (F_p \otimes I_m) D_{p,m} (I_p \otimes F_m) P_{n,p}$$

where:

n is the length of the transform, p is the number of PEs, and m=n/p is parameterized by the length of the transform n and the number of PEs, where m=n/p relates to the size of local memory needed by the PEs. For a given power-of-2 number of processing elements and a sufficient amount of available local PE memory, distributed FFTs of size p can be calculated on a ManArray processor since only hypercube connections are required. The hypercube of p or fewer nodes is a proper subset of the ManArray network. When p is a multiple of the number of processing elements, each PE emulates the operation of more than one virtual node. Therefore, any size of FFT problem can be handled using the above equation on any size of ManArray processor.

For direct execution, in other words, no emulation of virtual PEs, on a ManArray of size p, we need to provide a distributed FFT algorithm of equal size. For p=1, it is the sequential FFT. For p=2, the FFT of length 2 is the butterfly:

$$Y0 = x0 + w*X1, \text{ and}$$

$$Y1 = x0 - w*X1$$

where X0 and Y0 reside in or must be saved in the local memory of PE0 and X1 and Y1 on PE1, respectively. The VLIWs in PE0 and PE1 in a 1×2 ManArray processor (p=2) that are required for the calculation of multiple FFTs of length 2 are shown in FIG. 9J which shows that two FFT results are produced every two cycles using four VLIWs.

Extending Complex Multiplication

It is noted that in the two-cycle complex multiplication hardware described in FIGS. 6 and 7, the addition and subtraction blocks 623, 625, 723, and 725 operate in the second execution cycle. By including the MPYCX, MPYCXD2, MPYCXJ, and MPYCXJD2 instructions in the ManArray MAU, one of the execution units 131 of FIG. 1, the complex multiplication operations can be extended. The ManArray MAU also supports multiply accumulate operations (MACs) as shown in FIGS. 11A and 12A for use in general digital signal processing (DSP) applications. A multiply accumulate instruction (MPYA) 1100 as shown in FIG. 11A, and a sum two product accumulate instruction (SUM2PA) 1200 as shown in FIG. 12A, are defined as follows.

In the MPYA instruction 1100 of FIG. 11A, the product of source registers Rx and Ry is added to target register Rt. The word multiply form of this instruction multiplies two 32-bit values producing a 64-bit result which is added to a 64-bit odd/even target register. The dual halfword form of MPYA instruction 1100 multiplies two pairs of 16-bit values producing two 32-bit results: one is added to the odd 32-bit word, the other is added to the even 32-bit word of the odd/even target register pair. Syntax and operation details 1110 are shown in FIG. 11B. In the SUM2PA instruction 1200 of FIG. 12A, the product of the high halfwords of source registers Rx and Ry is added to the product of the low halfwords of Rx and Ry and the result is added to target register Rt and then stored in Rt. Syntax and operation details 1210 are shown in FIG. 12B.

Both MPYA and SUMP2A generate the accumulate result in the second cycle of the two-cycle pipeline operation. By merging MPYCX, MPYCXD2, MPYCXJ, and MPYCXJD2 instructions with MPYA and SUMP2A instructions, the hardware supports the extension of the complex multiply operations with an accumulate operation. The mathematical operation is defined as: $Z_T=Z_R+X_R Y_R-X_I Y_I+i(Z_I+X_R Y_I+X_I Y_R)$, where $X=X_R+iX_I, Y=Y_R+iY_I$ and i is an imaginary number, or the square root of negative one, with $i^2=-1$. This complex multiply accumulate is calculated in a variety of contexts, and it has been recognized that it will be highly advantageous to perform this calculation faster and more efficiently.

For this purpose, an MPYCXA instruction 1300 (FIG. 13A), an MPYCXAD2 instruction 1400 (FIG. 14A), an MPYCXJA instruction 1500 (FIG. 15A), and an MPYCXJAD2 instruction 1600 (FIG. 16A) define the special hardware instructions that handle the multiplication with accumulate for complex numbers. The MPYCXA instruction 1300, for multiplication of complex numbers with accumulate is shown in FIG. 13. Utilizing this instruction, the accumulated complex product of two source operands is rounded according to the rounding mode specified in the instruction and loaded into the target register. The complex numbers are organized in the source register such that halfword H1 contains the real component and halfword H0 contains the imaginary component. The MPYCXA instruction format is shown in FIG. 13A. The syntax and operation description 1310 is shown in FIG. 13B.

The MPYCXAD2 instruction 1400, for multiplication of complex numbers with accumulate, with the results divided by two is shown in FIG. 14A. Utilizing this instruction, the accumulated complex product of two source operands is divided by two, rounded according to the rounding mode specified in the instruction, and loaded into the target register. The complex numbers are organized in the source register such that halfword H1 contains the real component and halfword H0 contains the imaginary component. The MPYCXAD2 instruction format is shown in FIG. 14A. The syntax and operation description 1410 is shown in FIG. 14B.

The MPYCXJA instruction 1500, for multiplication of complex numbers with accumulate where the second argument is conjugated is shown in FIG. 15A. Utilizing this instruction, the accumulated complex product of the first source operand times the conjugate of the second source operand, is rounded according to the rounding mode specified in the instruction and loaded into the target register. The complex numbers are organized in the source register such that halfword H1 contains the real component and halfword H0 contains the imaginary component. The MPYCXJA instruction format is shown in FIG. 15A. The syntax and operation description 1510 is shown in FIG. 15B.

The MPYCXJAD2 instruction 1600, for multiplication of complex numbers with accumulate where the second argument is conjugated, with the results divided by two is shown in FIG. 16A. Utilizing this instruction, the accumulated complex product of the first source operand times the conjugate of the second operand, is divided by two, rounded according to the rounding mode specified in the instruction and loaded into the target register. The complex numbers are organized in the source register such that halfword H1 contains the real component and halfword H0 contains the imaginary component. The MPYCXJAD2 instruction format is shown in FIG. 16A. The syntax and operation description 1610 is shown in FIG. 16B.

All instructions of the above instructions 1100, 1200, 1300, 1400, 1500 and 1600 complete in two cycles and are pipelineable. That is, another operation can start executing on the execution unit after the first cycle. All complex multiplication instructions 1300, 1400, 1500 and 1600 return a word containing the real and imaginary part of the complex product in half words H1 and H0 respectively.

To preserve maximum accuracy, and provide flexibility to programmers, the same four rounding modes specified previously for MPYCX, MPYCXD2, MPYCXJ, and MPYCXJD2 are used in the extended complex multiplication with accumulate.

Figure 17:
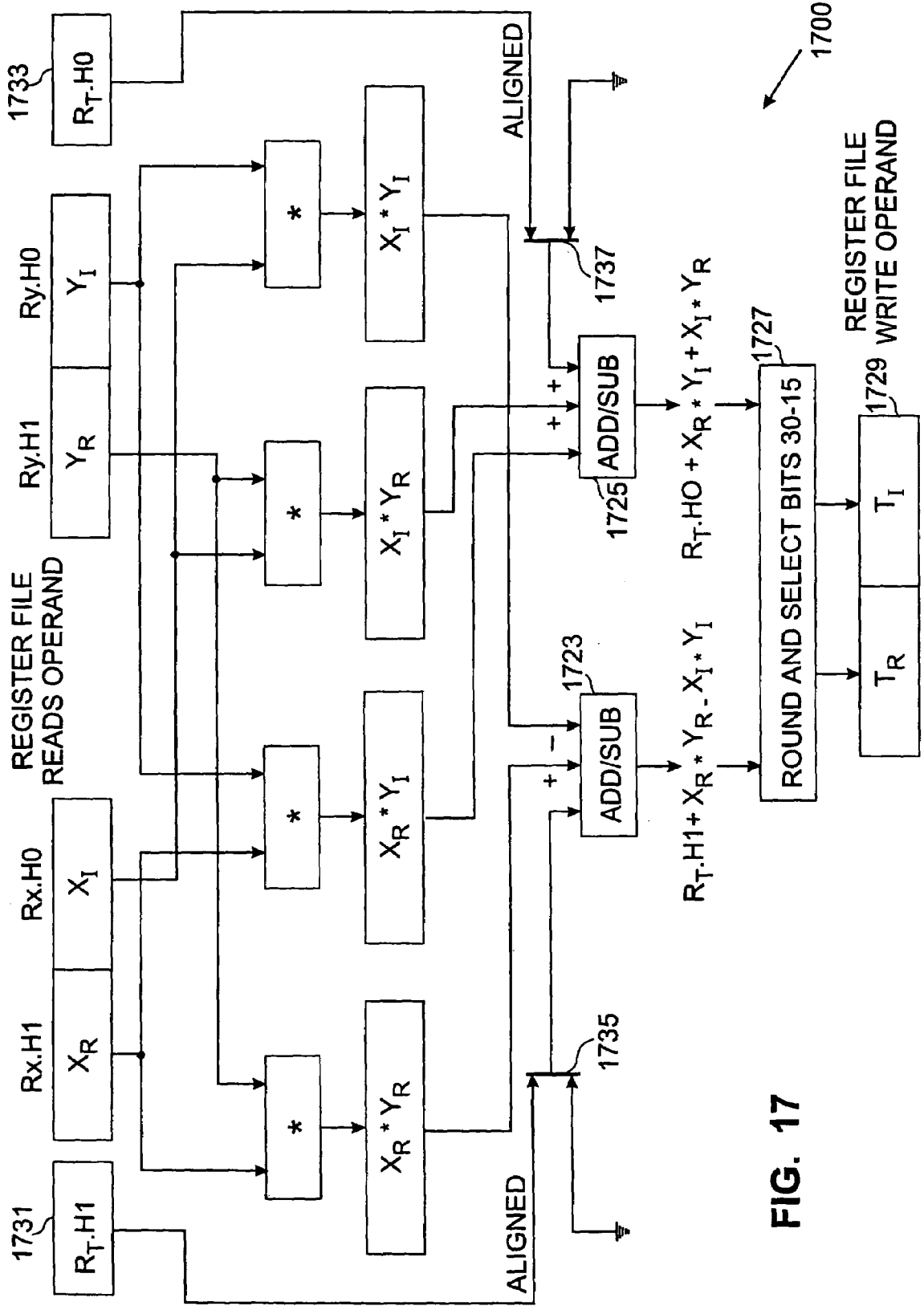
FIG. 17 illustrates hardware aspects of a pipelined multiply complex accumulate and its divide by two variant.
Figure 18:
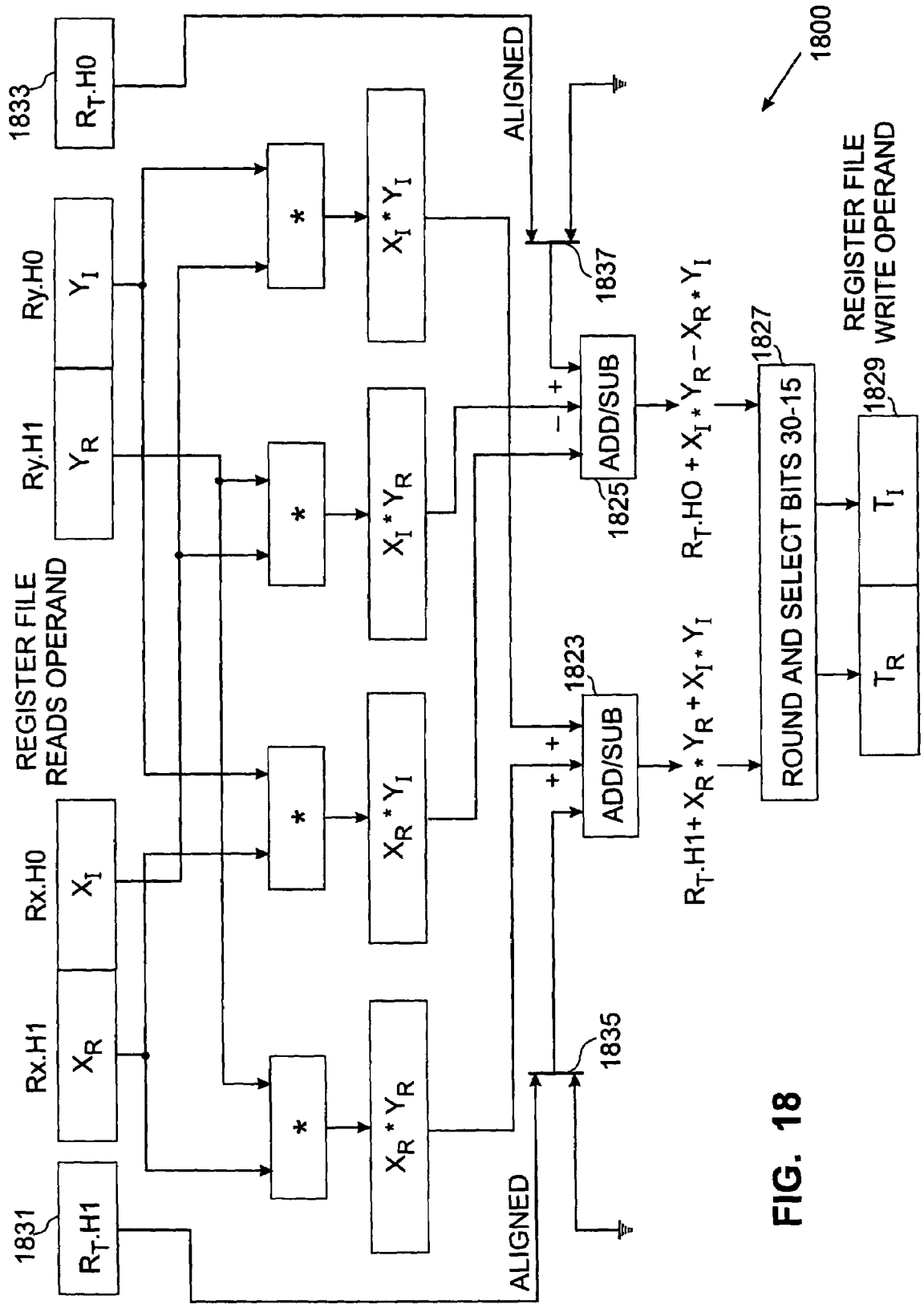
FIG. 18 illustrates hardware aspects of a pipelined multiply complex conjugate accumulate and its divide by two variant.

Hardware 1700 and 1800 for implementing the multiply complex with accumulate instructions is shown in FIG. 17 and FIG. 18, respectively. These figures illustrate the high level view of the hardware 1700 and 1800 appropriate for these instructions. The important changes to note between FIG. 17 and FIG. 6 and between FIG. 18 and FIG. 7 are in the second stage of the pipeline where the two-input adder blocks 623, 625, 723, and 725 are replaced with three-input adder blocks 1723, 1725, 1823, and 1825. Further, two new half word source operands are used as inputs to the operation. The Rt.H1 1731 (1831) and Rt.H0 1733 (1833) values are properly aligned and selected by multiplexers 1735 (1835) and 1737 (1837) as inputs to the new adders 1723 (1823) and 1725 (1825). For the appropriate alignment, Rt.H1 is shifted right by 1-bit and Rt.H0 is shifted left by 15-bits. The add/subtract, add/sub blocks 1723 (1823) and 1725 (1825), operate on the input data and generate the outputs as shown. The add function and subtract function are selectively controlled functions allowing either addition or subtraction operations as specified by the instruction. The results are rounded and bits 30-15 of both 32-bit results are selected 1727 (1827) and stored in the appropriate half word of the target register 1729 (1829) in the CRF. It is noted that the multiplexers 1735 (1835) and 1737 (1837) select the zero input, indicated by the ground symbol, for the non-accumulate versions of the complex multiplication series of instructions.

While the present invention has been disclosed in the context of various aspects of presently preferred embodiments, it will be recognized that the invention may be suitably applied to other environments consistent with the claims which follow.

We claim:

1. An apparatus to fetch and dispatch complex multiplication instructions for execution, the apparatus comprising:
   a VLIW memory (VIM) storing a complex multiplication instruction;
   a VIM controller to fetch and dispatch the complex multiplication instruction from the VIM for execution; and
   a complex multiplication execution unit which executes the fetched complex multiplication instruction operating on a complex number input operand to form a complex number result at the end of an execution cycle, the complex number result having the same format as the complex number input operand, whereby the complex number result is used as a complex number input operand for a subsequent fetched instruction.

2. The apparatus of claim 1 further comprising:
an instruction register to hold a dispatched multiply complex instruction (MPYCX);
a decoder to decode the MPYCX instruction and control the execution of the MPYCX instruction;
two source registers each holding a complex number as operand inputs to the multiply complex execution hardware;
four multiplication units to generate terms of the complex multiplication;
four pipeline registers to hold the multiplication results;
an add function which adds two of the multiplication results from the pipeline registers for the imaginary component of the result;
a subtract function which subtracts two of the multiplication results from the pipeline registers for the real component of the result;
a round and select unit to format the real and imaginary results; and
a result storage location for saving the final multiply complex result, whereby the apparatus is operative for the efficient processing of multiply complex computations.

3. The apparatus of claim 2 wherein the round and select unit provides a shift right as a divide by 2 operation for a multiply complex divide by 2 instruction (MPYCXD2).

4. The apparatus of claim 2 wherein the add function and subtract function are selectively controlled functions allowing either addition or subtraction operations as specified by the instruction.

5. The apparatus of claim 1 further comprising:
an instruction register to hold a dispatched multiply complex instruction (MPYCXJ);
a decoder to decode the MPYCXJ instruction and control the execution of the MPYCXJ instruction;
two source registers each holding a complex number as operand inputs to the multiply complex execution hardware;
four multiplication units to generate terms of the complex multiplication;
four pipeline registers to hold the multiplication results;
an add function which adds two of the multiplication results from the pipeline registers for the real component of the result;
a subtract function which subtracts two of the multiplication results from the pipeline registers for the imaginary component of the result;
a round and select unit to format the real and imaginary results; and
a result storage location for saving the final multiply complex conjugate result, whereby the apparatus is operative for the efficient processing of multiply complex conjugate computations.

6. The apparatus of claim 5 wherein the round and select unit provides a shift right as a divide by 2 operation for a multiply complex conjugate divide by 2 instruction (MPYCXJD2).

7. The apparatus of claim 5 wherein the add function and subtract function are selectively controlled functions allowing either addition or subtraction operations as specified by the instruction.

8. The apparatus of claim 1 further comprising:
an instruction register to hold a dispatched multiply accumulate instruction (MPYA);
a decoder to decode the MPYA instruction and control the execution of the MPYA instruction;
two source registers each holding e-source operands as input to the multiply accumulate execution hardware;
at least two multiplication units to generate two products of the multiplication;
at least two pipeline registers to hold the multiplication results;
at least two accumulate operand inputs to the second pipeline stage accumulate hardware;
at least two add functions which each adds the results from the pipeline registers with the at least two accumulate operand inputs creating two multiply accumulate results;
a round and select unit to format the results if required by the MPYA instruction; and
a result storage location for saving the final multiply accumulate result, whereby the apparatus is operative for the efficient processing of multiply accumulate computations.

9. The apparatus of claim 1 further comprising:
an instruction register to hold a dispatched multiply accumulate instruction (SUM2PA);
a decoder to decode the SUM2PA instruction and control the execution of the SUM2PA instruction;
at least two source registers each holding source operands as input to the SUM2PA execution hardware;
at least two multiplication units to generate two products of the multiplication;
at least two pipeline registers to hold the multiplication results;
at least one accumulate operand input to the second pipeline stage accumulate hardware;
at least one add function which adds the results from the pipeline registers with the at least one accumulate operand input creating a SUM2PA result;
a round and select unit to format the results if required by the SUM2PA instruction; and
a result storage location for saving the final result, whereby the apparatus is operative for the efficient processing of sum of 2 products accumulate computations.

10. The apparatus of claim 1 further comprising: an instruction register to hold a dispatched multiply complex accumulate instruction (MPYCXA);
a decoder to decode the MPYCXA instruction and control the execution of the MPYCXA instruction;
two source registers each holding a complex number as operand inputs to the multiply complex accumulate execution hardware;
four multiplication units to generate terms of the complex multiplication;
four pipeline registers to hold the multiplication results;
at least two accumulate operand inputs to the second pipeline stage accumulate hardware;
an add function which adds two of the multiplication results from the pipeline registers and also adds one of the at least two accumulate operand inputs for the imaginary component of the result;
a subtract function which subtracts two of the multiplication results from the pipeline registers and also adds the other accumulate operand input for the real component of the result;
a round and select unit to format the real and imaginary results; and a result storage location for saving the final multiply complex accumulate result, whereby the apparatus is operative for the efficient processing of multiply complex accumulate computations.

11. The apparatus of claim 10 wherein the round and select unit provides a shift right as a divide by 2 operation for a multiply complex accumulate divide by 2 instruction (MPYCXAD2).

12. The apparatus of claim 10 wherein the add function and subtract function are selectively controlled functions allowing either addition or subtraction operations as specified by the instruction.

13. The apparatus of claim 1 further comprising:
an instruction register to hold a dispatched multiply complex conjugate accumulate instruction (MPYCXJA);
a decoder to decode the MPYCXJA instruction and control the execution of the MPYCXJA instruction;
two source registers each holding a complex number as operand inputs to the multiply complex accumulate execution hardware;
four multiplication units to generate terms of the complex multiplication;
four pipeline registers to hold the multiplication results;
at least two accumulate operand inputs to the second pipeline stage accumulate hardware;
an add function which adds two of the multiplication results from the pipeline registers and also adds one of the at least two accumulate operand inputs for the real component of the result;
a subtract function which subtracts two of the multiplication results from the pipeline registers and also adds the other accumulate operand input for the imaginary component of the result;
a round and select unit to format the real and imaginary results; and
a result storage location for saving the final multiply complex conjugate accumulate result, whereby the apparatus is operative for the efficient processing of multiply complex conjugate accumulate computations.

14. The apparatus of claim 13 wherein the round and select unit provides a shift right as a divide by 2 operation for a multiply complex conjugate accumulate divide by 2 instruction (MPYCXJAD2).

15. The apparatus of claim 13 wherein the add function and subtract function are selectively controlled functions allowing either addition or subtraction operations as specified by the instruction.

16. The apparatus of claim 1 wherein the complex multiplication instructions and accumulate form of multiplication instructions include MPYCX, MPYCXD2, MPYCXJ, MPYCXJD2, MPYCXA, MPYCXAD2, MPYCXJA, MPYCXJAD2 instructions, and all of these instructions complete execution in 2 cylces.

17. A method to fetch and dispatch complex multiplication instructions for execution, the method comprising:
storing a complex multiplication instruction in a VLIW memory (VIM);
generating in a VIM controller VIM address and control signals to fetch and dispatch the complex multiplication instruction from the VIM for execution; and
executing the fetched complex multiplication instruction in a complex multiplication execution unit to operate on a complex number input operand and form a complex number result at the end of an execution cycle, the complex number result having the same format as the complex number input operand, whereby the complex number result is used as a complex number input operand for a subsequent fetched instruction.

18. The method of claim 17 further comprises:
fetching a short instruction word (SIW) from an SIW memory; and
dispatching the SIW to the VIM controller, wherein the SIW controls operations of the VIM controller.

19. An apparatus to fetch and dispatch complex multiplication instructions for execution, the apparatus comprising:
an instruction fetch controller for fetching short instruction words (SIWs) from an SIW memory and dispatching the SIWs to at least one processing element (PE), the at least one PE comprising:
a VLIW memory (VIM) storing a complex multiplication instruction;
a VIM controller for receiving the SIWs from the instruction fetch controller and for fetching and dispatching the complex multiplication instruction from the VIM for execution; and
a complex multiplication execution unit which executes the fetched complex multiplication instruction operating on a complex number input operand to form a complex number result at the end of an execution cycle, the complex number result having the same format as the complex number input operand, whereby the complex number result is used as a complex number input operand for a subsequent fetched instruction.

20. The apparatus of claim 19 further comprises a plurality of PEs, wherein the complex multiplication instruction fetched in one PE is different from the complex multiplication instruction fetched in the other PEs during an execution cycle.

* * * * *